(12) United States Patent
Carr et al.

(10) Patent No.: US 11,873,111 B2
(45) Date of Patent: Jan. 16, 2024

(54) FUEL CELL PROTECTION SYSTEM

(71) Applicant: Textron Innovations Inc., Providence, RI (US)

(72) Inventors: Timothy Brian Carr, Fort Worth, TX (US); Douglas Howard Hamelwright, Grapevine, TX (US); Joshua Andrew Emrich, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 226 days.

(21) Appl. No.: 17/143,387

(22) Filed: Jan. 7, 2021

(65) Prior Publication Data
US 2022/0212550 A1   Jul. 7, 2022

(51) Int. Cl.
| | |
|---|---|
| *B64D 37/32* | (2006.01) |
| *B60L 50/72* | (2019.01) |
| *B64C 27/00* | (2006.01) |
| *B64D 37/02* | (2006.01) |

(52) U.S. Cl.
CPC .............. *B64D 37/32* (2013.01); *B60L 50/72* (2019.02); *B64C 27/00* (2013.01); *B64D 37/02* (2013.01); *B60L 2200/10* (2013.01)

(58) Field of Classification Search
CPC ..... B60L 50/72; B60L 2200/10; B64D 37/02; B64D 37/32; B64D 1/22
See application file for complete search history.

(56) References Cited

U.S. PATENT DOCUMENTS

| | | | | |
|---|---|---|---|---|
| 4,593,870 | A * | 6/1986 | Cronkhite | F16F 7/12 244/119 |
| 4,925,057 | A * | 5/1990 | Childress | B60K 15/077 169/45 |
| 5,069,318 | A * | 12/1991 | Kulesha | F16F 7/12 188/377 |
| 5,451,015 | A * | 9/1995 | Cronkhite | B64D 37/04 244/119 |
| 6,959,894 | B2 * | 11/2005 | Hayashi | F16F 7/124 267/140 |
| 7,909,288 | B2 * | 3/2011 | Anghileri | B64D 45/0061 244/135 R |
| 8,047,465 | B2 * | 11/2011 | Payen | B64C 1/062 244/119 |
| 9,520,612 | B2 * | 12/2016 | Sato | H01M 8/248 |
| 9,932,104 | B2 * | 4/2018 | Behrens | B64C 1/18 |
| 9,944,403 | B2 * | 4/2018 | Park | B64D 37/08 |
| 10,640,226 | B2 * | 5/2020 | Park | B60K 15/03 |
| 2002/0047015 | A1 * | 4/2002 | Distelhoff | B60K 15/03177 220/562 |

(Continued)

*Primary Examiner* — Michael H Wang
(74) *Attorney, Agent, or Firm* — Fogarty LLP

(57) ABSTRACT

Embodiments are directed to a fuel cell protection system comprising an aircraft fuselage having an inner surface and an outer surface, an attachment point mounted on the outer surface, an aircraft fuel cell spaced apart from the inner surface, and a plate positioned between the inner surface and the aircraft fuel system, the plate spaced apart from the inner surface to create a void space. The attachment point may be a cargo hook. The void space is configured to receive all or a portion of the cargo hook after a crash. The plate creating the void space may be a rigid material or may be a ballistic fabric material.

15 Claims, 9 Drawing Sheets

(56) References Cited

U.S. PATENT DOCUMENTS

| | | | |
|---|---|---|---|
| 2005/0085146 A1* | 4/2005 | Farkas | F41H 5/0478 |
| | | | 442/134 |
| 2019/0241271 A1* | 8/2019 | Haugeberg | B64D 25/16 |
| 2019/0300194 A1* | 10/2019 | Leachman | H01M 50/116 |
| 2020/0102086 A1* | 4/2020 | Carr | B64C 27/28 |

\* cited by examiner

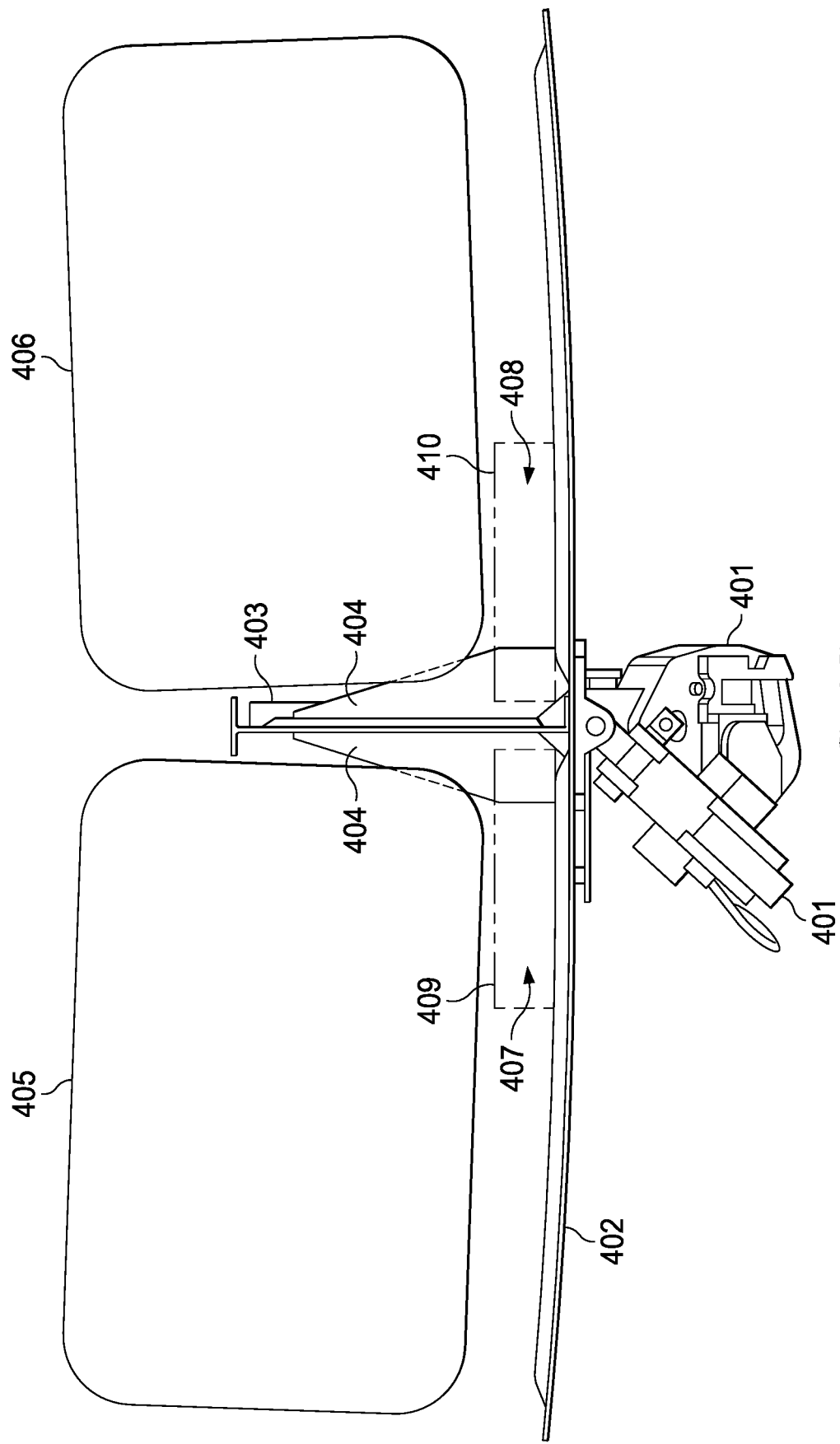

FUEL CELL PROTECTION SYSTEM

BACKGROUND

Aircraft certification regulations ensure protection of aircraft fuel tanks and require that damage to fuel cells is minimize during a crash. Among other responsibilities, the United States Federal Aviation Administration (FAA) has established airworthiness standards for aircraft, such as airplanes and rotorcraft. The FAA also provides airworthiness approval for aircraft and aircraft component to certify that they conform to an approved design and are in a condition for safe operation. FAA regulations directed to airworthiness standards for transport rotorcraft require crash resistance for aircraft fuel systems. These standards are intended to minimize the hazard of fuel fires to occupants following an otherwise survivable impact, such as a crash landing. Additionally, FAA regulations require that fuel systems be capable of sustaining certain static and dynamic deceleration loads without structural damage to the fuel tanks or their components that could leak fuel to an ignition source.

One requirement for obtaining rotorcraft fuel system airworthiness approval is the successful completion of a drop test. The drop test requirements include: (1) a drop height of at least 50 feet; (2) a nondeforming drop impact surface; (3) fuel tanks filled with water to 80 percent of the normal full capacity or with fuel to the full capacity; (4) the fuel tank must be enclosed in a surrounding structure representative of the installation unless it can be established that the surrounding structure is free of projections or other design features likely to contribute to rupture of the tank; (5) the fuel tank must drop freely and impact in a horizontal position+/−10 degrees; and (6) after the drop test, there must be no leakage. External structures, such as cargo hooks or other protrusions on the belly of the aircraft, are a threat to fuel cell integrity during a crash.

SUMMARY

Embodiments are directed to systems and methods for minimizing damage to the fuel cells of an aircraft during a crash by providing an area for cargo hooks and other external accessories to fold into. The structure surrounding the cargo hook is allowed to damage and deflect, but the area for cargo hooks provides space between the damage and the fuel cells to capture puncture threats.

In an example embodiment, a fuel cell protection system comprises an aircraft fuselage having an inner surface and an outer surface, an attachment point mounted on the outer surface, an aircraft fuel cell spaced apart from the inner surface, and a plate positioned between the inner surface and the aircraft fuel system, the plate spaced apart from the inner surface to create a void space. The attachment point may be a cargo hook. The void space is configured to receive all or a portion of the cargo hook after a crash. The plate creating the void space may be a rigid material or may be a ballistic fabric material.

The fuel cell protection system may further comprise at least one sidewall coupled to one or more edges of the plate. The at least one sidewall is configured to hold the plate apart from the inner surface. The at least one sidewall is an integral part of the plate and is fixedly attached to the inner surface of the fuselage. Alternatively, a tab may be coupled to an edge of the at least one sidewall and is fixedly attached to the inner surface of the fuselage.

The fuel cell protection system may further comprise an aircraft structural beam attached to the fuselage inner surface, and a second tab coupled to at least one edge of the plate, wherein the second tab is fixedly attached to the structural beam.

In another example, a rotorcraft comprises a fuselage having an inner surface and an outer surface, a cargo hook is attached to the outer surface, a fuel tank having a plurality of interconnected fuel bags is spaced apart from the inner surface of the fuselage, and a fuel cell protection compartment between the inner surface and the fuel tank, wherein the fuel protection compartment is configured to receive all or a portion of the cargo hook after a crash. The fuel cell protection compartment is configured to prevent the cargo hook from damaging the fuel tank. The fuel cell protection compartment comprises a plate positioned between the inner surface and the fuel tank, wherein the plate is spaced apart from the inner surface to create a void space. The plate may be a rigid material or a ballistic fabric material.

The plate has at least one sidewall. The at least one sidewall is configured to hold the plate apart from the inner surface. The sidewall has a tab that is fixedly attached to the inner surface of the fuselage. The rotorcraft further comprises a structural beam attached to the inner surface of the fuselage. The plate has at least one edge, and a tab coupled to the at least one edge of the plate. The tab has a surface that is fixedly attached to the structural beam.

BRIEF DESCRIPTION OF THE DRAWINGS

Figure 1A:
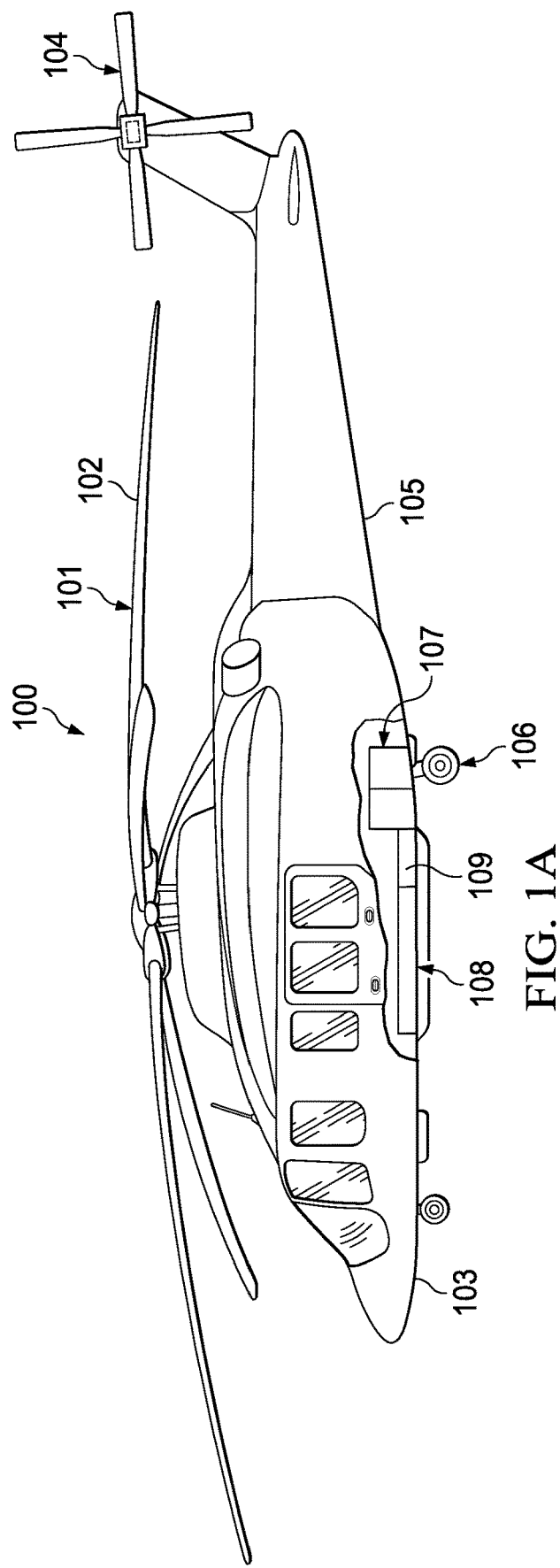
Figure 1B:
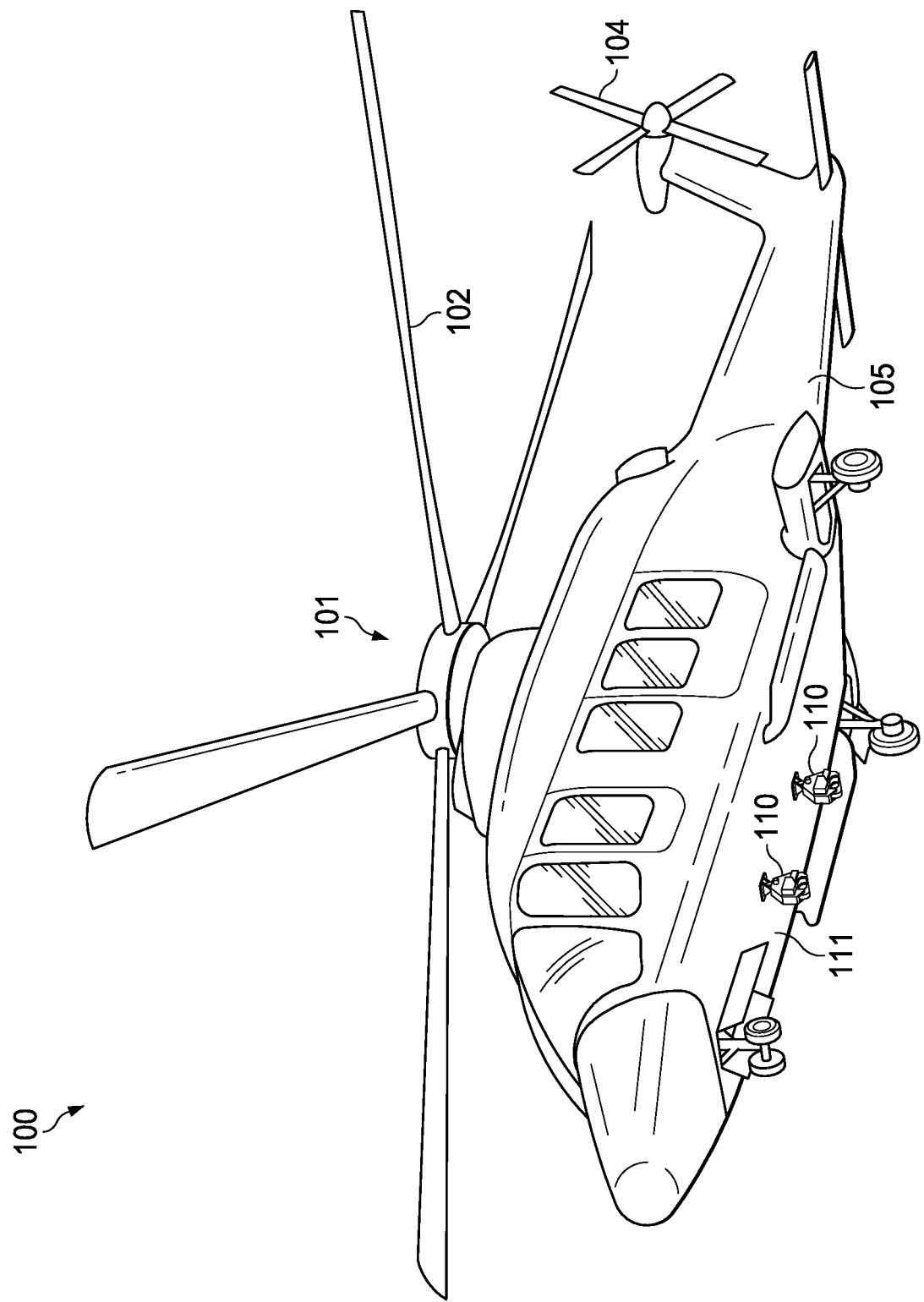

Having thus described the invention in general terms, reference will now be made to the accompanying drawings, which are not necessarily drawn to scale, and wherein:

FIGS. 1A and 1B are oblique views of an aircraft adapted for use with a fuel cell protection system according to this disclosure.

Figure 2:
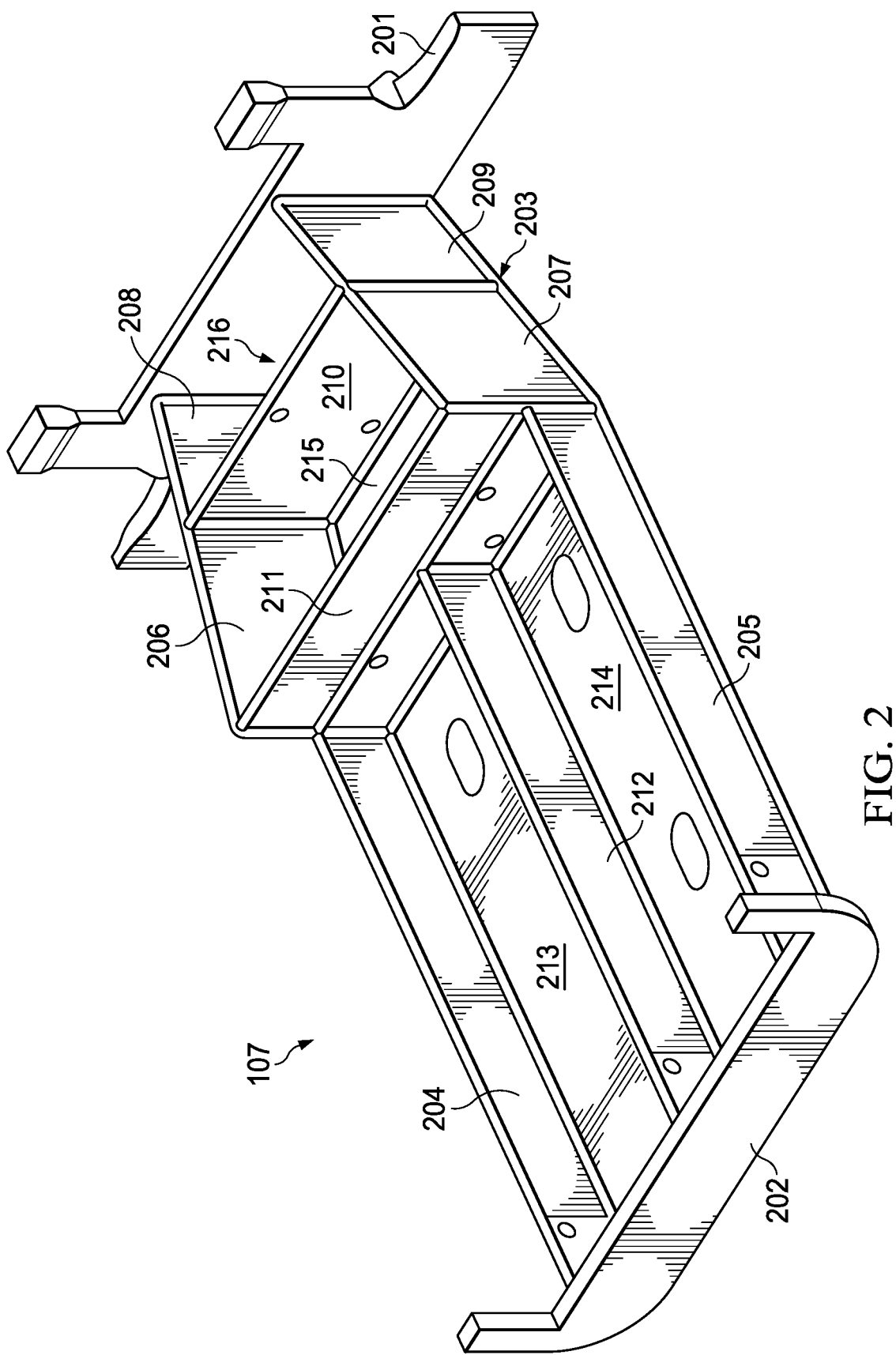

FIG. 2 is an isometric view of a fuel tank receiving assembly for use with a fuel cell protection system in accordance with embodiments of the present disclosure.

Figure 3:
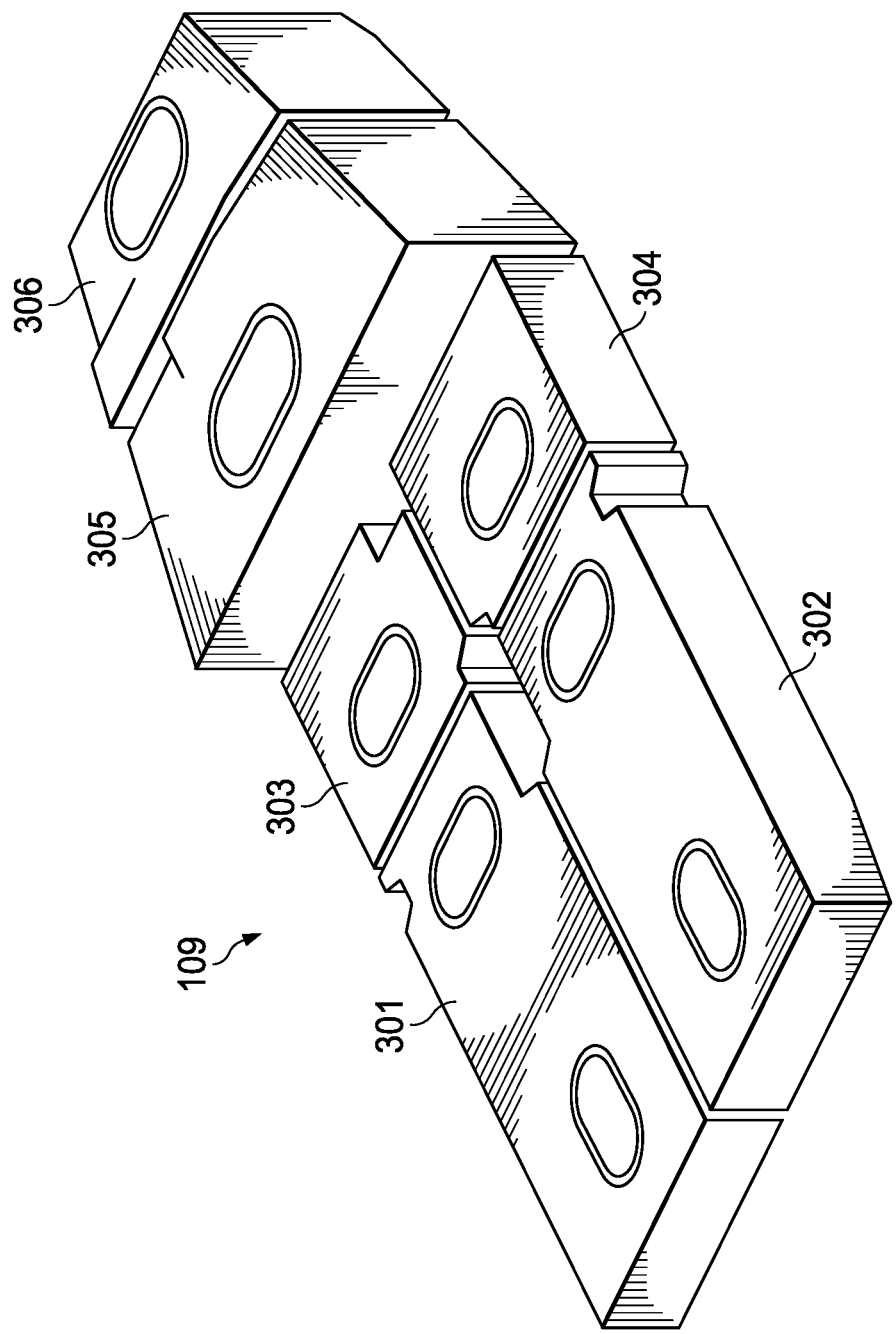
Figure 4A:
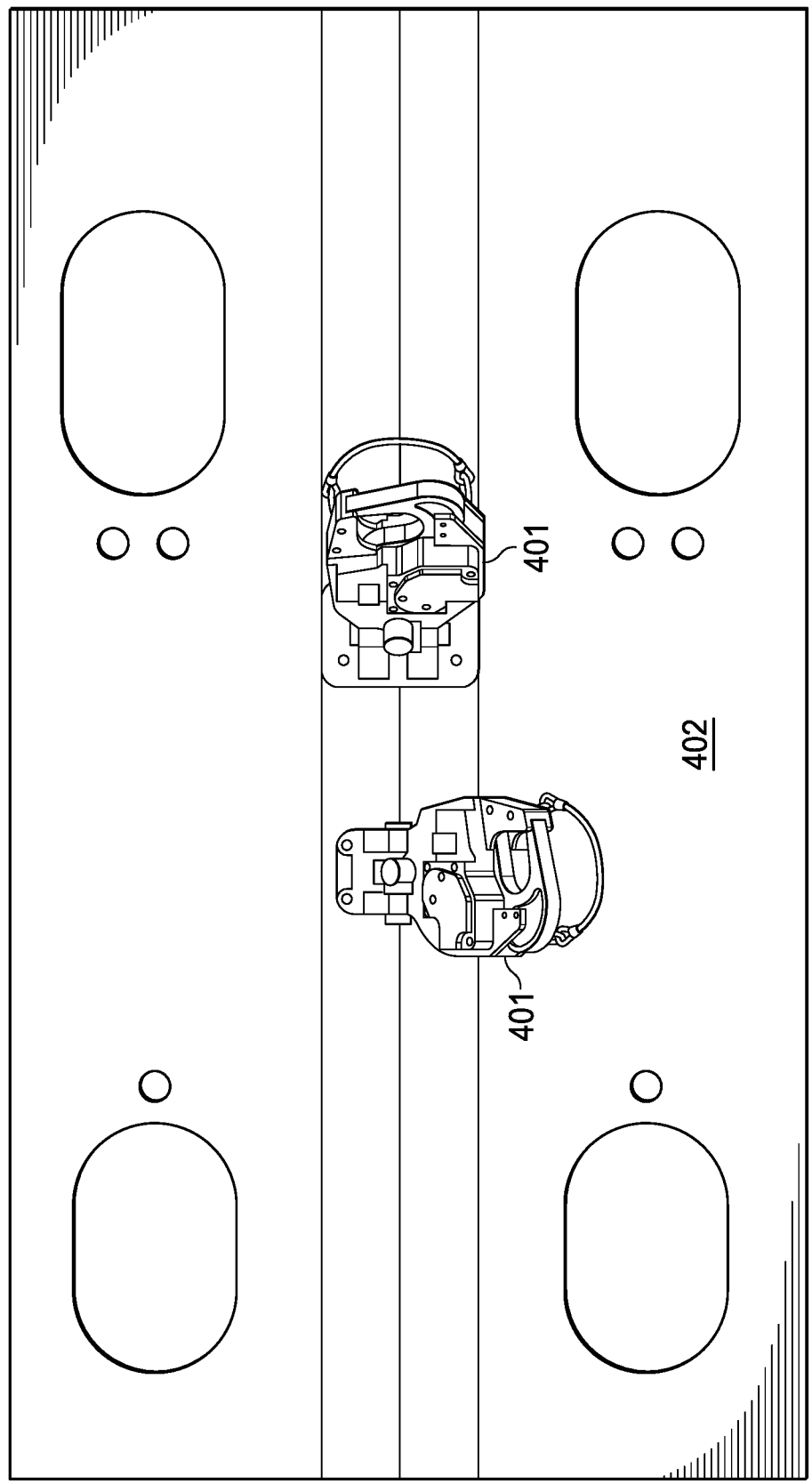
Figure 4B:
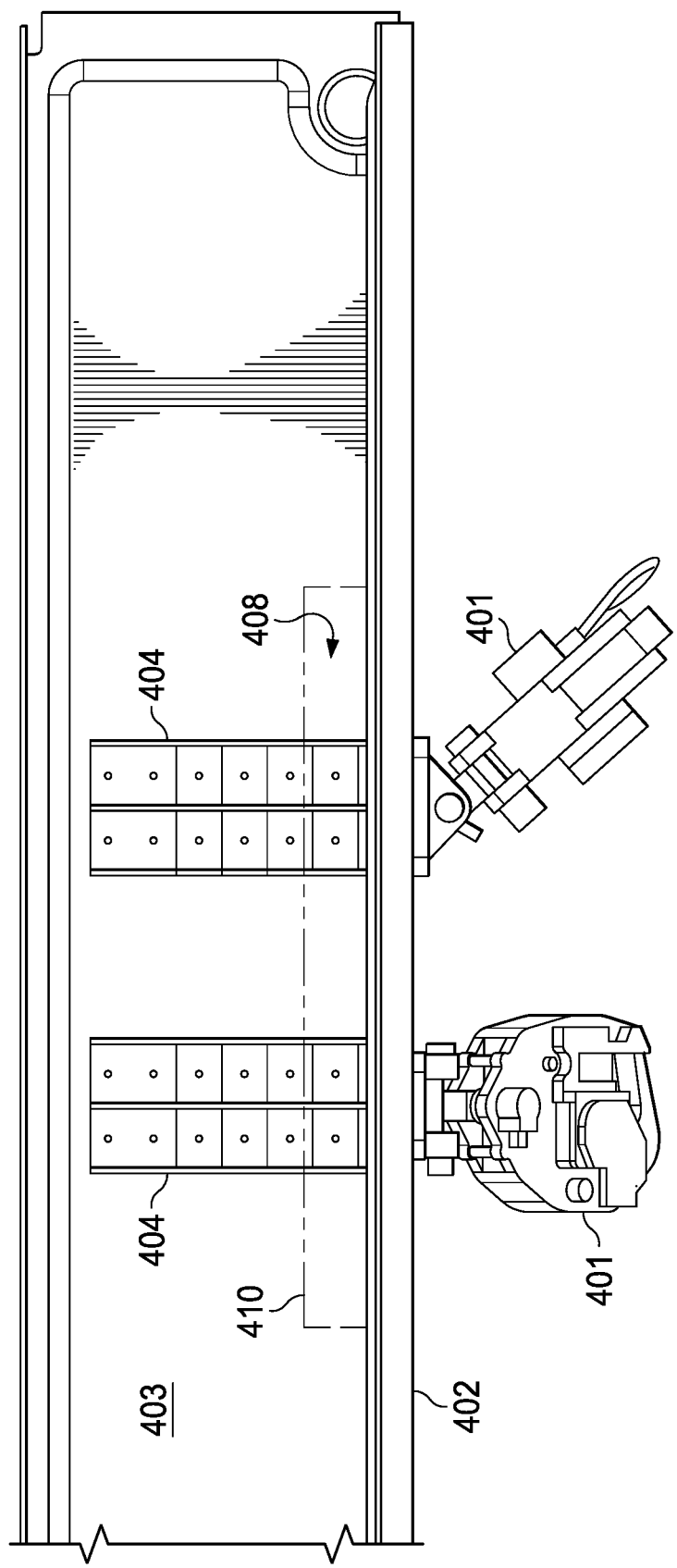
Figure 4D:
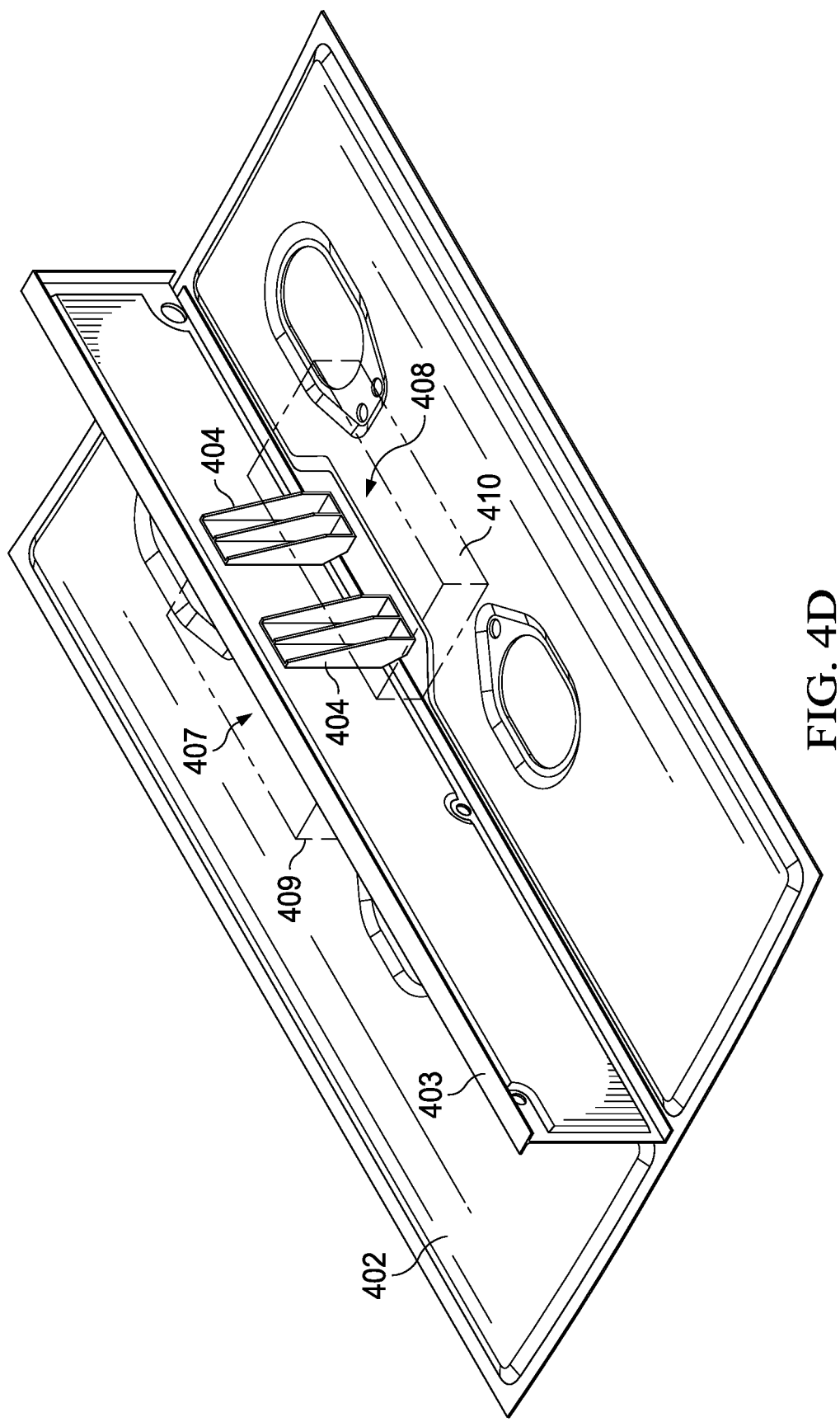

FIG. 3 is an isometric view of a fuel tank for use with a fuel cell protection system in accordance with embodiments of the present disclosure.

FIGS. 4A-4D are various views illustrating a fuel cell protection system according to an example embodiment.

Figure 5A:
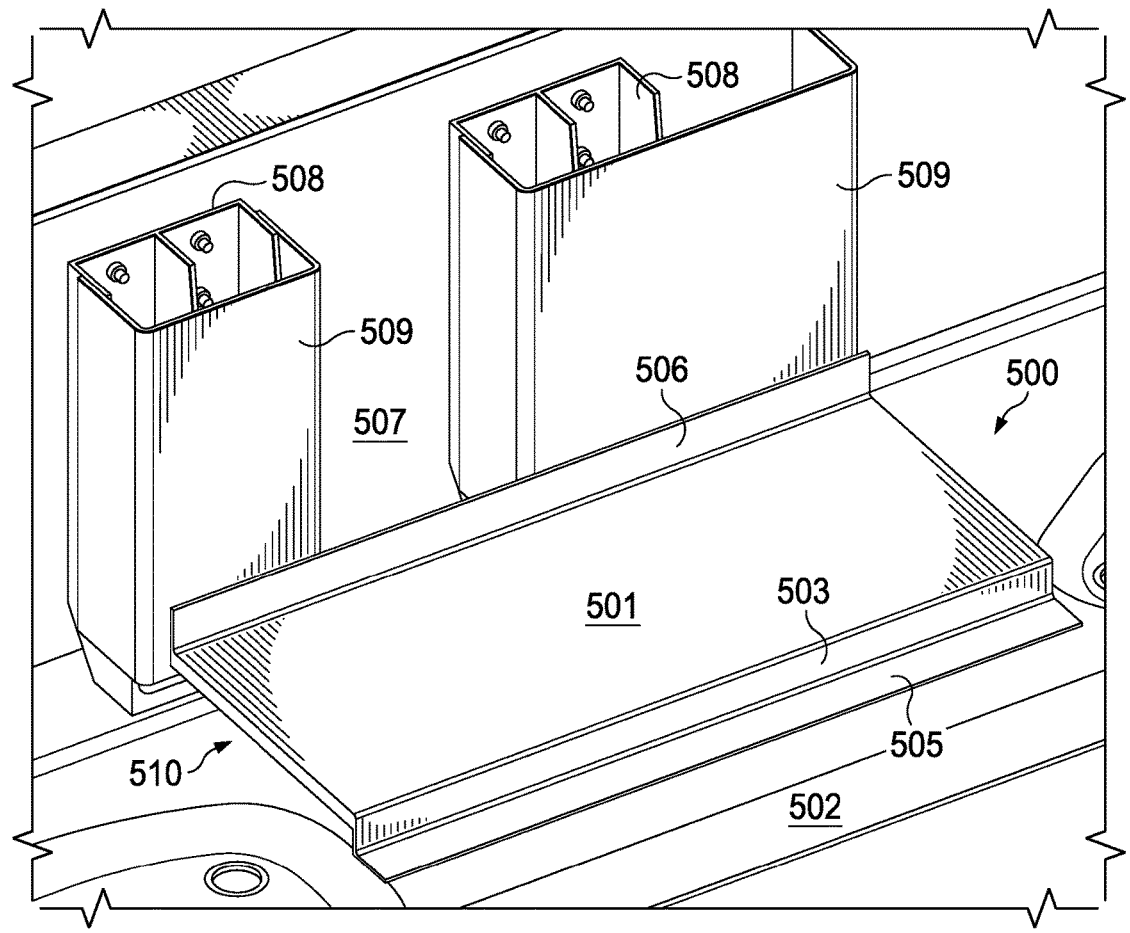
Figure 5B:
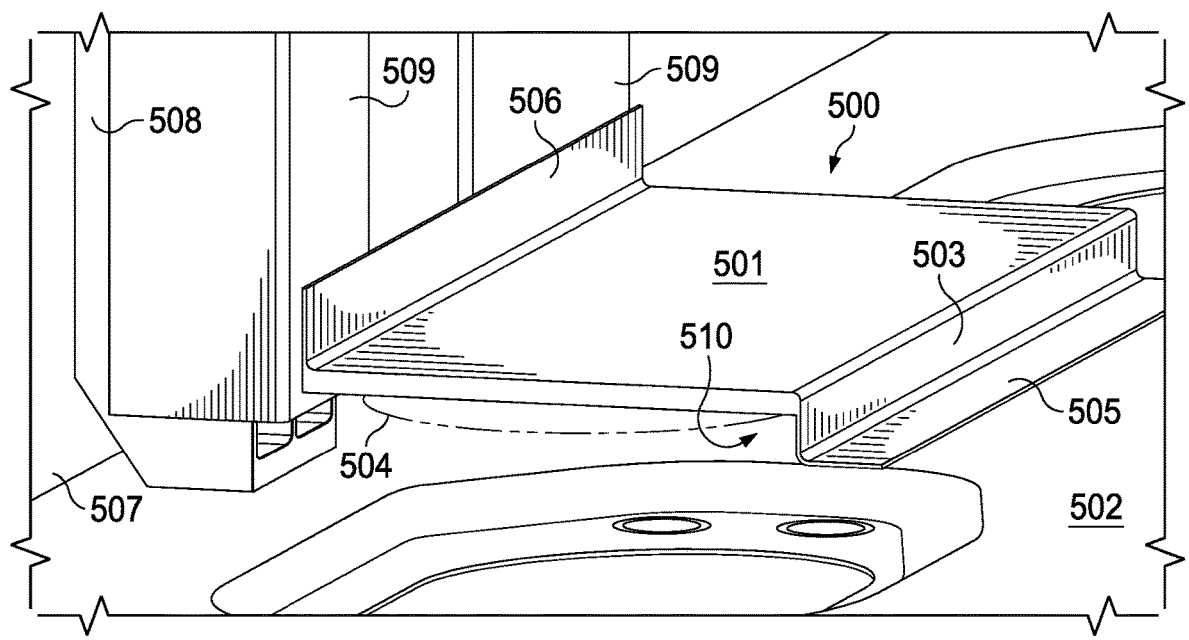

FIGS. 5A-5B are oblique views illustrating an alternative fuel cell protection system according to another example embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring to FIGS. 1A-1B, a rotorcraft 100 is schematically illustrated. Rotorcraft 100 has a rotor system 101 with a plurality of rotor blades 102. The pitch of rotor blades 102 can be collectively and cyclically manipulated to selectively control direction, thrust, and lift of rotorcraft 100. Rotorcraft 100 includes a fuselage 103, an anti-torque system 104 and an empennage 105. Rotorcraft 100 has a landing gear system 106 to provide ground support for the aircraft. Located within a lower portion of fuselage 103, rotorcraft 100 includes a fuel tank receiving assembly 107 that supports and contains a fuel system 108 including a fuel tank 109. Liquid fuel is contained within fuel tank 109 that is used to power one or more engines that drive rotor system 101 and anti-torque system 104. One or more cargo hooks 110 are mounted on a belly or underside 111 of the fuselage of aircraft 100. Cargo hooks 110 allow the transport of external loads during flight.

It should be appreciated that rotorcraft 100 is merely illustrative of a variety of aircraft that can implement the embodiments disclosed herein. Other aircraft implementations can include hybrid aircraft, tilt rotor aircraft, unmanned aircraft, gyrocopters, and a variety of helicopter configurations, to name a few examples. It should be appreciated that even though aircraft are particularly well suited to implement the embodiments of the present disclosure, non-aircraft vehicles and devices can also implement the embodiments.

FIG. 2 depicts a fuel tank receiving assembly 107 is illustrated. Fuel tank receiving assembly 107 may be fully or partially integral with fuselage 103 of rotorcraft 100 or may be independent of but secured to fuselage 103 of rotorcraft 100. In the illustrated embodiment, rotorcraft bulkhead 201 forms an aft portion of fuel tank receiving assembly 107 and rotorcraft bulkhead 202 forms a forward portion of fuel tank receiving assembly 107. Rotorcraft bulkhead 201 and rotorcraft bulkhead 202 may be formed from a metal such as aluminum, composite, or other suitable material. Fuel tank receiving assembly 107 includes a frame structure 203 that may be a unitary frame structure or may be formed from a plurality of frame elements. Frame structure 203 may be formed from a metal such as aluminum, polymer, composite, or other suitable material. Frame structure 203 supports a plurality of panel members including side panel members 204, 205 of a forward portion of fuel tank receiving assembly 107, side panel members 206, 207 of a middle portion of fuel tank receiving assembly 107 and side panel members 208, 209 of an aft portion of fuel tank receiving assembly 107. Frame structure 203 also supports lateral panel 2100 between the middle and aft portions of fuel tank receiving assembly 107 and panel 211 between the forward and middle portions of fuel tank receiving assembly 107. Frame structure 203 further supports longitudinal panel 212 between right and left sections of the forward portion of fuel tank receiving assembly 107.

Frame structure 203 supports lower panels 213, 214 in the forward portion of fuel tank receiving assembly 107, lower panel 215 in the middle portion of fuel tank receiving assembly 107 and a lower panel 216 in the aft portion of fuel tank receiving assembly 107. The various panels may be formed from a metal such as aluminum, polymer, composite, or other suitable material and may be attached to, coupled to or integral with frame structure 203. The various panels include openings to allow fluid lines or other systems to pass through one or more panels or entirely through fuel tank receiving assembly 107. Even though fuel tank receiving assembly 107 has been described as having frame and panel construction, it should be understood by those skilled in the art that fuel tank receiving assembly 107 could be constructed in any number of different manners including, but not limited to, as a single unitary assembly, as multiple unitary subassemblies such as a front subassembly, a middle subassembly, and an aft subassembly, or in another suitable manner. Likewise, portions of fuel tank receiving assembly 107 could alternatively be formed by sections of keel beams connected to or integral with fuselage 103 of rotorcraft 100 such as a pair of side keel beams and a central keel beam each of which extends in the longitudinal direction of fuel tank receiving assembly 107. Regardless of the specific manner of construction, important features of fuel tank receiving assembly 107 include being sized and shaped to operably receive and contain fuel tank 109 therein.

Referring now to FIG. 3 in the drawings, a fuel tank 109 is illustrated. In the illustrated embodiment, fuel tank 109 is depicted as having six interconnected fuel bags including forward bags 301, 302, feed bags 303, 304, middle bag 305 and aft bag 306. Also, as illustrated, the height of middle bag 305 and aft bag 306 may be greater than that of forward bags 301, 302 and feed bags 303, 304. The volume of fuel that may be stored in fuel tank 109 will depend on the particular implementation but will typically be on the order of several hundred to a thousand gallons. Even though fuel tank 109 has been described as having a particular number of fuel bags in a particular configuration, it should be understood by those skilled in the art that fuel tank 109 could have any number of fuel bags both less than or greater than six and the fuel bags could be arranged in any manner of different configurations depending upon the particular implementation. Although the term fuel bag is used in the example embodiment, it will be understood that the fuel protection system disclosed herein may be used with any flexible or rigid fuel cell manufactured of any material.

Lower panels 213-216 may form underside 111 (FIG. 1B) of aircraft 100 or may be adjacent to underside 111. During a crash, cargo hooks 110 on underside 111 may puncture, deform, or otherwise damage underside 111. As a result, lower panels 213-216 of fuel tank receiving assembly 107 may be damaged and may in turn puncture, tear, split, or otherwise damage fuel bags 301-306 of fuel tank 109. Such damage would make it possible for the fuel bags 301-306 to leak fluid during and following a crash impact, thereby creating a post-crash fire risk.

FIGS. 4A-4D depict cargo hooks 401 mounted on the exterior face of underside belly skin 402 of an aircraft. Cargo hooks 401 may be positioned under or in line with keel beam 403, such as an I-beam. A backbone 404 or other reinforcement structure may provide a mounting structure for each cargo hook 401. The cargo hooks 401 are secured to the aircraft to transfer the weight of any associated payload (e.g., any item vertically supported by the hooks 401) to the aircraft. The cargo hooks 401 are located vertically below the fuselage skin 402, and below fuel tanks 405, 406. With the cargo hook 401 being located below the tanks 405, 406, the hooks 401 may be forced upward and into the space occupied by the fuel tanks 405, 406 during a crash.

Intrusions into the fuel tanks 405, 406 by cargo hooks 401 during a crash or impact are prevented by creating a protected area 407, 408 for the cargo hooks 401 to fold into during a crash. This protected area 407, 408 allows the surrounding structure to damage and deflect, while leaving some space between the damaged underside 402 and the fuel bags 405, 406 to capture puncture threats. The protected areas 407, 408 are created by a structure 409, 410, respectively, that encloses the protected areas 407, 408 entirely or in part. Structure 409, 410 creates a space or void 407, 408 between belly skin 402 and fuel bags 405, 406. The structure 409, 410 may be constructed of a rigid material, such as an aluminum, polymer, composite, or other material. Alternatively, structure 409, 410 may be created using flexible materials or ballistic fabric, such as Kevlar® or other strong synthetic polymer.

This configuration prevents the rupture or puncture of fuel bags 405, 406 in response to an impact that forces underside 402 and/or belly-carried accessories, such as cargo hooks 401, in an upward direction. During a crash, cargo hooks 401 may penetrate belly skin 402 and enter protected areas 407, 408. Alternatively, cargo hooks 401 may deform belly skin 402 upward and into protected areas 407, 408. In either case, the cargo hooks 401 are not allowed to penetrate fuel bags 405, 406, which prevents the fuel bags 405, 406 from leaking fluid during and following a crash impact, thereby minimizing post-crash conflagration risk. Even if cargo hooks 401 or belly skin 402 are able to penetrate structure 409, 410 and impact fuel bags 405, 406, the additional structure 409, 410 will absorb some of the energy in the cargo hooks 401 or belly skin 402 and will minimize any damage to fuel bags 405, 406.

While cargo hooks 401 are shown as conventional cargo hooks, it will be understood that in other embodiments, the hook system may comprise any other hook or device suitable for facilitating the hanging or mounting of a payload, rail, tank, or other accessory. Additionally, in other embodiments, the protected areas 407, 408 formed by structures 409, 410 are not limited to the underside of an aircraft. The protected areas 407, 408 but can be deployed in any other compartment in an aircraft or other vehicle that requires extra protection for fuel cells.

As noted above, structures 409, 410 may be any appropriate material to form the protected areas 407, 408. The size and shape of the protected areas 407, 408 created by structures 409, 410 may generally have a box or channel shape.

FIGS. 5A and 5B illustrate a fuel cell protection system 500 according to an example embodiment. Plate 501 is generally parallel to fuselage skin 502. Plate 501 is spaced apart from fuselage skin 502 by one or more sidewalls 503. The dimensions and size of plate 501 are selected to entirely cover the region 504 that may be impacted, penetrated, or deformed by an external hook or other accessory. The region 504 may be selected based upon all possible crash modes, which may include lateral as well as vertical motion so that the external hook may bend forward, back, or sideways on impact.

A tab 505 on sidewall 503 is attached to fuselage skin 502. Tab 505 may be attached or bonded to fuselage skin 502 using any appropriate method, such as an adhesive, weld, rivet, or other fasteners. At least one wall 503 is attached to one edge of plate 501. One or more other edges of plate 501 have a tab 506 that is attached to beam 507, reinforcement structure 508, or mounting structure 509. Tab 506 may be attached using any appropriate method, such as an adhesive, weld, rivet, or other fasteners. In other embodiments, tab 506 may be attached to fuselage skin 502. In further embodiments, plate 501 is held spaced apart from fuselage skin by two or more sidewalls 503 with or without tabs 505 and without connection directly to beam 507, reinforcement structure 508, or mounting structure 509.

Generally, fuel cells (not shown) are positioned above plate 501, and a cargo hook or external accessory (not shown) is located vertically below fuselage skin 502 under region 504. During a crash or impact against the underside of fuselage skin 502, the cargo hook could be forced upward and into the space occupied by the fuel cell. However, such intrusions into the fuel tanks are prevented by plate 501, which creates a void or space 510 that allows the cargo hook and fuselage skin 502 to be forced in an upward direction without hitting the fuel cells. The open space 510 may be configured to accept all or a portion of the cargo hook. Alternatively, the cargo hook and fuselage skin 502 may be forced upward and into plate 501, which may be moved further upward; however, plate 501 would distribute and absorb the force of any such upward movement thereby preventing catastrophic damage to the fuel cells.

Although plate 501 is shown as having a rectangular shape in the embodiment illustrated herein, it will be understood that plate 501 may have any appropriate shape as required to create a void space 510 having sufficient dimensions to receive all or a portion of a cargo hook upon deformation following a crash impact. In addition to cargo hooks, the void space 510 may be adapted to receive all or a portion of an attachment point, mounting device, suspension system, rail, bracket, or other device connected to the belly of a helicopter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A fuel cell protection system, comprising:
   an aircraft fuselage having an inner surface and an outer surface;

an attachment point mounted on the outer surface;

an aircraft fuel cell spaced apart from the inner surface; and a rigid plate positioned between the inner surface and the aircraft fuel system, the plate dimensioned and sized to cover a region impacted, penetrated or deformed by the attachment mount during a crash and spaced apart from the inner surface to create an empty void space, spacing the aircraft fuel cell apart from the inner surface, the void space configured to accept all or a portion of the attachment mount.

2. The fuel cell protection system of claim 1, wherein the attachment point is a cargo hook.

3. The fuel cell protection system of claim 1, further comprising:

at least one sidewall coupled to one or more edges of the plate, the at least one sidewall configured to hold the plate apart from the inner surface.

4. The fuel cell protection system of claim 3, wherein the at least one sidewall is an integral part of the plate.

5. The fuel cell protection system of claim 3, further comprising:

a tab coupled to an edge of the at least one sidewall, the tab fixedly attached to the inner surface.

6. The fuel cell protection system of claim 1, further comprising:

an aircraft structural beam attached to the fuselage inner surface; and a tab coupled to at least one edge of the plate, the tab fixedly attached to the structural beam.

7. The fuel cell protection system of claim 1, further comprising:

an aircraft structural beam attached to the fuselage inner surface;

a first tab coupled to a first edge of the plate, the first tab having a surface fixedly attached to the structural beam;

a sidewall coupled to a second edge of the plate, the sidewall configured to hold the plate apart from the inner surface; and a second tab coupled to the sidewall, the second tab having a surface fixedly attached to the inner surface.

8. The fuel cell protection system of claim 7, wherein the sidewall, first tab, and second tab are formed from a single ballistic fabric material.

9. A rotorcraft comprising:

a fuselage having an inner surface and an outer surface;

a cargo hook attached to the outer surface;

a fuel tank including a plurality of interconnected fuel bags operable to contain liquid fuel spaced apart from the inner surface; and a fuel cell protection compartment between the inner surface and the fuel tank, the fuel cell protection compartment comprising a rigid plate dimensioned and sized to cover a region impacted, penetrated or deformed by the cargo hook during a crash and positioned between the inner surface and the fuel tank, spaced apart from the inner surface to create an empty void space spacing the aircraft fuel cell apart from the inner surface, the fuel cell protection compartment configured to receive all or a portion of the cargo hook after the crash.

10. The rotorcraft of claim 9, wherein the fuel cell protection compartment is configured to prevent the cargo hook from damaging the fuel tank.

11. The rotorcraft of claim 9, wherein the fuel cell protection compartment comprises:

the plate having at least one sidewall, the at least one sidewall configured to hold the plate apart from the inner surface, and the sidewall having a tab fixedly attached to the inner surface of the fuselage.

12. The rotorcraft of claim 9, further comprising:

a structural beam attached to the inner surface of the fuselage, and wherein the plate has at least one edge, a tab coupled to the at least one edge of the plate, the tab having a surface fixedly attached to the structural beam.

13. An aircraft fuel cell protection method comprising:

disposing an aircraft fuel cell in an aircraft fuselage comprising an inner surface, an outer surface and an attachment point mounted on the outer surface, the aircraft fuel cell spaced apart from the inner surface;

selecting dimensions and size of a rigid plate to cover a region impacted, penetrated or deformed by the attachment point during a crash;

positioning the plate between the inner surface and the aircraft fuel cell;

spacing the plate apart from the inner surface, defining an empty void space spacing the aircraft fuel cell apart from the inner surface; and receiving all, or a portion, of the attachment mount in the void space during the crash of the aircraft.

14. The method of claim 13 further comprising, defining at least one sidewall and at least one tab in the plate, the sidewall holding the plate spaced apart from the inner surface, and the tab fixedly attaching the plate to the inner surface of the fuselage.

15. The method of claim 13 further comprising:

attaching a structural beam to the inner surface;

coupling at least one tab to at least one edge of the plate; and fixedly attaching the at least one tab to the structural beam.

* * * * *